Aug. 22, 1939.   N. Y. ANDERSEN   2,170,257
CASTER
Filed Feb. 4, 1937
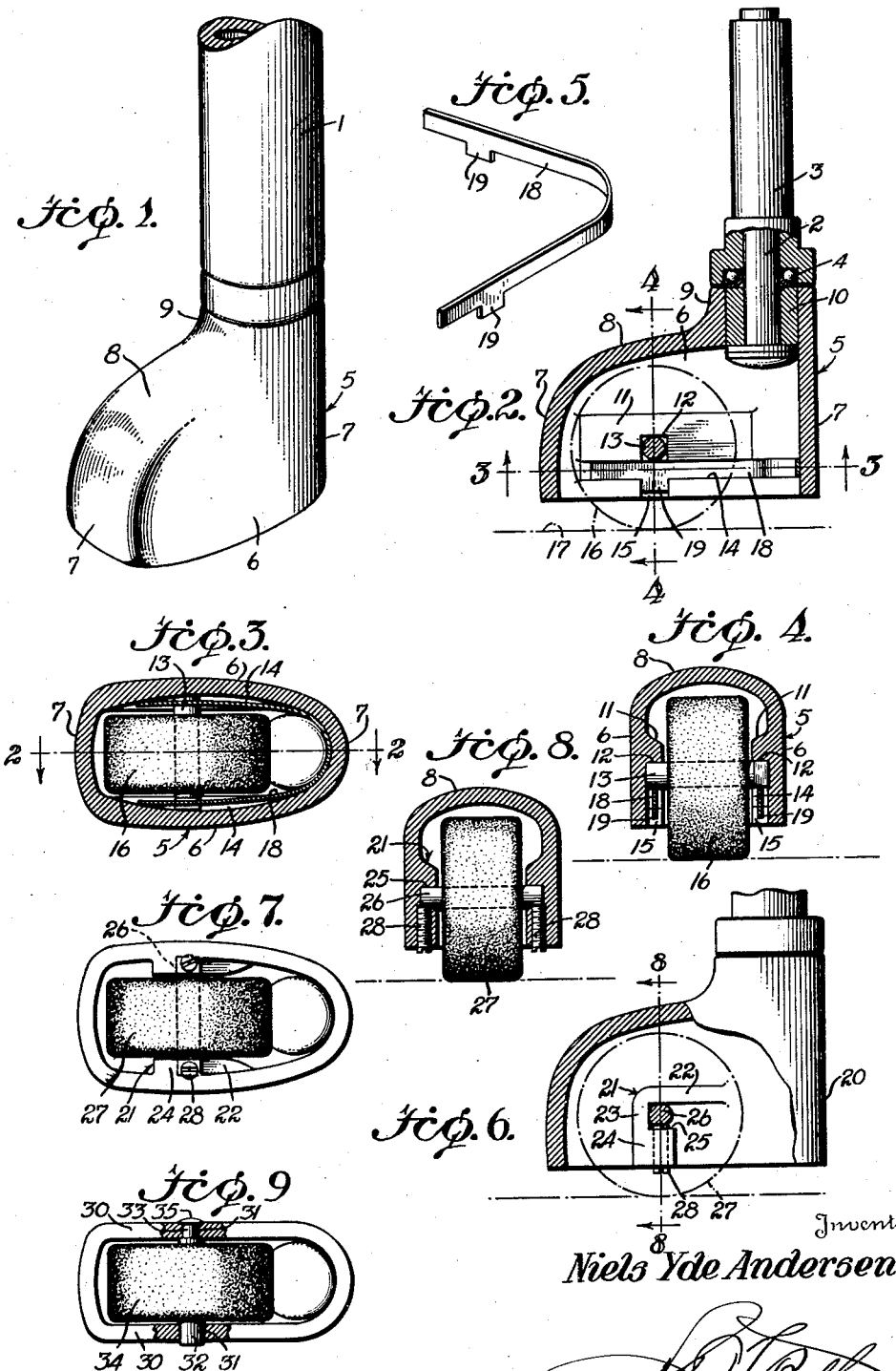
Inventor
Niels Yde Andersen, Patented Aug. 22, 1939

2,170,257

UNITED STATES PATENT OFFICE 2,170,257

CASTER

Niels Yde Andersen, Kenmore, N. Y., assignor to Remington Rand Inc., Buffalo, N. Y.

Application February 4, 1937, Serial No. 124,065

5 Claims. (Cl. 16—31)

This invention relates to casters, and particularly casters designed for use on chairs and other similar articles of furniture.

The invention comprehends the provision of a caster that is provided with a housing for the supporting wheel, so constructed that it will overcome the disadvantages of previous caster constructions, by substantially eliminating the marring of objects with which the casters may come in contact, the scuffing of shoes, and in addition, will provide a caster construction having a housing to replace the usual horn that will not become deformed in the use of the caster with excessive weight, and a housing structure that will present a new and pleasing appearance.

The invention further comprehends the provision of a caster construction using a housing with suitable means for detachably mounting the wheel therein, in which the wheel mounting means may be entirely concealed within the housing with the wheel so that only a very small portion of the periphery of the wheel projects below the housing for rolling contact with a floor surface.

In the drawing

Fig. 1 shows the invention applied to a fragmentary portion of the leg of a piece of furniture, in perspective.

Fig. 2 is a vertical cross section taken on line 2—2 of Fig. 3, through the caster shown in Fig. 1 removed from the furniture leg with the stem and portions of the socket shown in elevation.

Fig. 3 is a horizontal cross section taken on line 3—3 of Fig. 2.

Fig. 4 is a vertical cross section taken on line 4—4 of Fig. 2.

Fig. 5 shows the axle retaining member in perspective.

Fig. 6 is a side elevation of a modified form of caster made according to the invention with portions broken away and shown in section and the wheel shown in dot and dash lines.

Fig. 7 is a bottom plan view of the caster shown in Fig. 6.

Fig. 8 is a vertical cross section taken on line 8—8 of Fig. 6.

Fig. 9 is a bottom plan view of another modified form of caster construction showing portions broken away to illustrate a slightly different form of securing means for the axle.

The leg of a piece of furniture such as a posture chair, or the like, has the end portion indicated at 1 in Fig. 1. Leg 1 mounts the caster construction of the present invention on the lower end to provide a new and novel appearance in casters as can be determined by looking at Fig. 1 of the drawing.

The caster comprises a stem 2 rotatably mounted in socket 3 having a ball bearing assembly 4 at the lower end, as shown in Fig. 2. This socket construction is of conventional form well known in the art.

The usual horn is replaced by caster housing 5 in the present invention. Caster housing 5 is formed to provide side walls 6, end walls 7, top wall 8 and an open bottom as clearly shown by the drawing. The housing is formed with a small cylindrical neck 9 at one side of the top portion to provide a small opening whose axis is offset from the axis or center of the larger opening at the bottom of the housing as shown by Fig. 2. A plug 10 is mounted within neck 9 as shown in Fig. 2, and receives stem 2 for rigidly mounting the stem on the housing.

Side walls 6 have the inner faces formed with inwardly extending projections 11 recessed to provide sockets 12 for receiving opposite ends of axle 13. Below socket 12 projections 11 are formed with channels 14 extending parallel with the bottom edge of the housing as clearly shown in Fig. 2, while vertical slotted portions 15 are aligned with sockets 12 so the axle may be removed from the sockets in a convenient manner.

Axle 13 rotatably mounts caster wheel 16 which is almost completely housed within casing 5 as illustrated in the drawing, in such a way that only a small segment of the periphery of the wheel projects outwardly through the bottom of the housing for peripheral engagement with a floor surface or other supporting surface indicated by the dot and dash lines in the drawing at 17. Axle 13 is retained in its socket by means of a retainer member or means in the form of leaf spring member 18 of U-shaped construction that has its end portions engaged at opposite sides of wheel 16 in channels 14. Retaining member 18 is held in position in channels 14 by means of projections 19 on opposite ends thereof engaging in slots 15 as clearly shown in Figs. 2 and 4. The spring or retaining member 18 normally assumes the position shown in Fig. 5 and must have the ends brought toward one another before it can be inserted in the housing to retain the axle in the socket. This retaining member is engaged in the housing by drawing the ends together in this manner and sliding these ends in the open bottom of the housing along the inner faces of projections 11 until the ends register with channels 14 when they will immediately drop into channels 14 in the manner shown in Fig. 2, projections 19 of course being aligned with slots 15. This will rigidly retain axle 13 in socket 12 and when it is desired to remove the axle from the housing, retaining member 18 may be readily removed by using a pair of thin blade members such as knife blades or an instrument similar to a pair of tweezers, inserting the end in slots 15 outside of projections 19 and then by forcing the projections 19 against the sides of wheel 16 the ends of retaining member 18 are drawn inwardly toward each other to a position inwardly of the ends of projections 11. In this position the retaining member may be removed from the housing so as to provide for the removal of wheel 16 and axle 13.

The modified form of invention shown in Figs. 6, 7 and 8 has the housing 20 constructed in the same manner as housing 5 except that instead of having projections 11 on the inner faces of the side walls, the projections on the inner faces of the side walls indicated at 21 are of different structure than projections 11, so as to provide a rib 22 spaced inwardly from the bottom edge of the side walls and substantially parallel thereto, with laterally extending portions 23 at one end of each rib 22 terminating in enlarged projections 24 having a portion thereof projecting in spaced parallel relation with rib 22 to form a socket or seat 25 for receiving the ends of axle 26 rotatably mounting wheel 27. Enlarged portion 24 of projection 21 is formed with a screw threaded bore threadedly receiving retaining screw 28. As shown in the drawing, screw 28 is engaged in enlarged portion 24 from the bottom edge of the housing and extends vertically so as to engage the lower portion of axle 26, as shown in Fig. 6, when it is engaged in seat 25 for firmly forcing the end of the axle against rib 22 and rigidly retaining the same in the seat. The screws are operated by a screw driver in the usual manner and it is obvious that when the screws are loosened the axle may be moved horizontally parallel to the bottom edge of the housing until the ends of axle 26 are disengaged from seats 25 whereupon the axle may be removed from the housing with wheel 27. Sufficient clearance is provided at the end of the housing to provide for this lateral movement of the axle and its wheel for engagement and disengagement of the ends of the axle in seats 25 on opposite side walls.

Figure 9 illustrates a housing constructed in a manner similar to that above described having side walls 30 formed with apertures 31 adapted to receive axle 32 therein. Axle 32 has a reduced end 33 and one of the apertures 31 is smaller than the other so that the axle is inserted first through the larger aperture, then through wheel 34 so as to engage reduced end 33 in the smaller aperture, into the position shown in Fig. 9. Then by providing a riveting operation on the end of reduced end 33 a head is formed as indicated at 35 serving to retain the axle against removal through apertures 31 unless forcibly driven therethrough by suitable means well known in the art. Axle 32 is normally not detachable from the housing in the manner of the axles shown in the preceding figures of the drawing and described above, but may be removed in the manner described and replaced with a new axle whenever it may be desired to replace wheel 34.

It will be noted from the drawing that each of the side and end walls, as well as the top wall, are of curved formation for the most part, so that the edges of the various walls merge one into the other to provide a dome-shaped housing structure having rounded sides, ends and edges in keeping with modern features of design. This housing structure in being formed in this manner, not only presents a new and novel appearance in caster structure, but provides a rigid wheel supporting housing that can not easily be deformed. One of the common troubles overcome by this housing structure, in eliminating the usual horn used in casters, is elimination of the trouble caused by the horn becoming deformed. The invention provides in this housing structure a means for almost entirely concealing the wheel so that it can not come in contact with the shoes or clothes of users of furniture equipped therewith, and the housing eliminates sharp edges and corners to prevent clothes from catching and thereby effectively guards against damaging objects which may come in contact with the housing or caster assembly. The axle is mounted in the housing in a plane offset from the stem so that the housing can readily rotate with the stem in following the motion of the piece of furniture over a floor surface or the like to provide for the free movement of the furniture. The invention further provides novel retaining means for the caster wheel and axle accessible only from the bottom of the housing and thereby normally conceals such securing means from view.

The invention claimed is:

1. A caster, comprising a stem, a housing mounted on said stem having side walls, one or more end walls and open at the bottom, a wheel within said housing having only a minor peripheral portion projecting outwardly beyond the bottom of said side walls for peripheral surface contact with a supporting surface, an axle extending transversely between said side walls rotatably mounting said wheel, projections extending inwardly on the inner faces of said side walls forming sockets for receiving the ends of said axle at opposite sides of said wheel, and means locking said axle ends in said sockets.

2. A caster, comprising a stem, a housing mounted on said stem having side walls, one or more end walls and open at the bottom, a wheel within said housing having only a minor peripheral portion projecting outwardly beyond the bottom of said side walls for peripheral surface contact with a supporting surface, an axle extending transversely between said side walls rotatably mounting said wheel, means formed on and projecting inwardly from the inner faces of said side walls receiving the ends of said axle, and means detachably mounted on said last-named means for retaining said axle ends engaged in said receiving means.

3. A caster, comprising a stem, a housing mounted on said stem having side walls, one or more end walls and open at the bottom, a wheel within said housing having only a minor peripheral portion projecting outwardly beyond the bottom of said side walls for peripheral surface contact with a supporting surface, an axle extending transversely between said side walls rotatably mounting said wheel, sockets provided on the inner sides of said side walls for receiving opposite ends of said axle, and a flexible member having interlocking engagement with portions on the inner sides of said side walls for retaining said axle engaged in said sockets.

4. A caster comprising a stem, a housing mounted on said stem having side walls, one or more end walls and open at the bottom, a wheel within said housing having only a minor peripheral portion projecting outwardly beyond the bottom of said side walls for peripheral surface contact with a supporting surface, an axle extending transversely between said side walls rotatably mounting said wheel, projections extending inwardly from the inner faces of said side walls to form sockets for detachably receiving the ends of said axle, and a resilient strip member formed with opposite ends cooperating with portions of said projections on each side wall for retaining said axle ends in said sockets.

5. A caster comprising a stem, a housing mounted on said stem having side walls, one or more end walls and open at the bottom, a wheel within said housing having only a minor peripheral portion projecting outwardly beyond the bottom of said side walls for peripheral surface contact with a supporting surface, an axle extending transversely between said side walls rotatably mounting said wheel, projections extending inwardly from the inner faces of said side walls to form sockets to receive opposite ends of said axle, said projections having slots extending along the inner faces of said side walls from said seats and opening at the bottom of said housing and transverse slots parallel with the bottom edge of the housing, and a resilient U-shaped strip member having its ends engaged in said transverse slots on the inner faces of opposite side walls and resiliently interlocked with said projections to retain said axle ends in said sockets.

NIELS YDE ANDERSEN.